US012073276B2

(12) United States Patent
Cassidy et al.

(10) Patent No.: US 12,073,276 B2
(45) Date of Patent: *Aug. 27, 2024

(54) RFID BEAD LABEL DEVICES CAPABLE OF WITHSTANDING AND MAINTAINING RFID OPERABILITY FOR IDENTIFICATION PURPOSES DURING AND POST-VULCANIZATION OF RUBBER ARTICLES

(71) Applicant: FineLine Technologies, Norcross, GA (US)

(72) Inventors: Glenn M. Cassidy, O'Fallon, MO (US); Michael E. Borgna, O'Fallon, MO (US); Jos Uijlenbroek, Ophemert (NL)

(73) Assignee: FINELINE TECHNOLOGIES, Norcross, GA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/201,478

(22) Filed: May 24, 2023

(65) Prior Publication Data

US 2023/0297806 A1    Sep. 21, 2023

Related U.S. Application Data

(63) Continuation of application No. 17/591,938, filed on Feb. 3, 2022, now Pat. No. 11,675,994, which is a
(Continued)

(51) Int. Cl.
*G06K 19/077* (2006.01)
*B32B 7/12* (2006.01)
*B32B 25/08* (2006.01)

(52) U.S. Cl.
CPC ............ *G06K 19/0776* (2013.01); *B32B 7/12* (2013.01); *B32B 25/08* (2013.01);
(Continued)

(58) Field of Classification Search
CPC .......... G06K 19/0776; G06K 19/07728; B32B 7/12; B32B 25/08
(Continued)

(56) References Cited

U.S. PATENT DOCUMENTS

| 9,944,131 B2 | 4/2018 | Wei et al. |
| 11,263,509 B2 | 3/2022 | Cassidy et al. |

(Continued)

FOREIGN PATENT DOCUMENTS

| JP | 2017-531825 A | 10/2017 |
| JP | 2018-027777 A | 2/2018 |

OTHER PUBLICATIONS

International Search Report for PCT/US2019/060280 mailed Jan. 31, 2020 (2 pages).
(Continued)

*Primary Examiner* — Ahshik Kim
(74) *Attorney, Agent, or Firm* — Shumaker, Loop & Kendrick, LLP

(57) ABSTRACT

Disclosed are pre-cure RFID-enabled bead labels based on an RFID inlay construction consisting of an aluminum antenna etched on to a high temperature resistant polyimide film that is connected to an integrated memory circuit positioned on the surface of the polyimide film. This RFID inlay being further inserted into an overall label construction having a plurality of layers that include, for example, a plurality of polyester layers and a plurality of high temperature resistant adhesive layers that bond/adhere layers together, the plurality of layers further protecting and insulating the RFID inlay while the label is bonded to the external bead (or sidewall) of a tire. The compositions/devices disclosed herein can be used for electronic identification when applied on rubber-based articles (e.g., tires) prior to being subjected to stress related to the vulcanization
(Continued)

process and normal use of this article during the manufacturing process.

7 Claims, 13 Drawing Sheets

Related U.S. Application Data continuation of application No. 17/290,862, filed as application No. PCT/US2019/060280 on Nov. 7, 2019, now Pat. No. 11,263,509.

(60) Provisional application No. 62/756,799, filed on Nov. 7, 2018.

(52) U.S. Cl.
CPC ... *G06K 19/07728* (2013.01); *G06K 19/0773* (2013.01); *B32B 2255/10* (2013.01); *B32B 2255/26* (2013.01); *B32B 2255/28* (2013.01); *B32B 2519/02* (2013.01)

(58) Field of Classification Search
USPC .......................................... 235/492
See application file for complete search history.

(56) References Cited

U.S. PATENT DOCUMENTS

| | | | |
|---|---|---|---|
| 11,675,994 B2* | 6/2023 | Cassidy | ........... G06K 19/07722 235/492 |
| 2006/0290505 A1 | 12/2006 | Conwell et al. | |
| 2016/0107490 A1 | 4/2016 | Randall et al. | |
| 2017/0277992 A1 | 9/2017 | Janko et al. | |
| 2019/0039341 A1 | 2/2019 | Keenan et al. | |
| 2020/0398616 A1 | 12/2020 | Ohta | |
| 2021/0053306 A1 | 2/2021 | Cassidy et al. | |

OTHER PUBLICATIONS

Written Opinion for PCT/US2019/060280 mailed Jan. 31, 2020 (3 pages).

Japanese Office Action for JP Pat. Appln. No. 2021-525044, drafted Oct. 12, 2021 and mailed Oct. 19, 2021 with English Translation (6 pages).

Korean Office Action for KR Pat. Appln. No. 10-2021-7017061, mailed Oct. 19, 2021 with English Tranisation (5 pages).

* cited by examiner

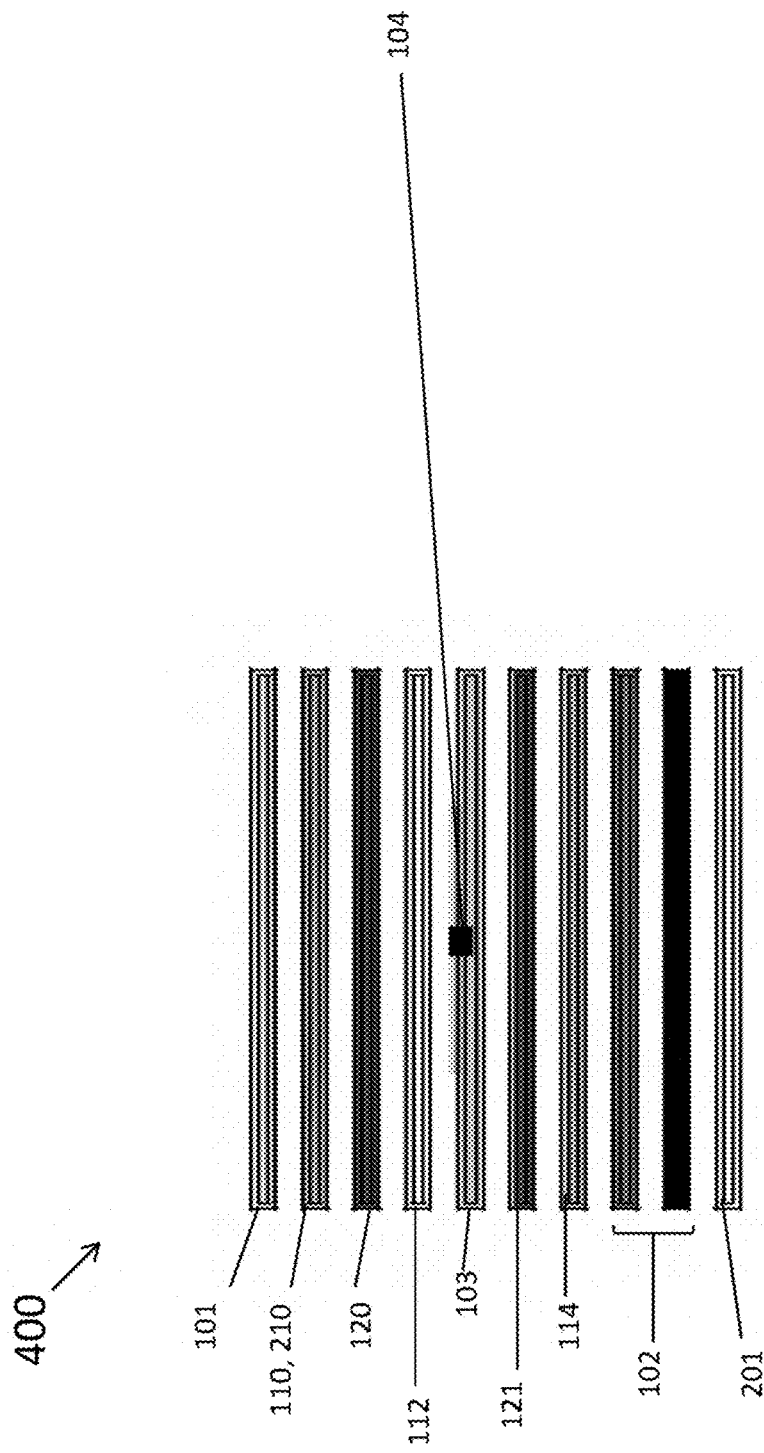

RFID BEAD LABEL DEVICES CAPABLE OF WITHSTANDING AND MAINTAINING RFID OPERABILITY FOR IDENTIFICATION PURPOSES DURING AND POST-VULCANIZATION OF RUBBER ARTICLES

CROSS REFERENCE TO RELATED APPLICATIONS

This application claims priority to U.S. patent application Ser. No. 17/591,938 filed Feb. 3, 2022, now issued U.S. Pat. No. 11,675,994, which is a continuation application of a U.S. patent application Ser. No. 17/290,862 filed May 3, 2021, now issued as U.S. Pat. No. 11,263,509, which claims priority from PCT/US19/60280 filed on Nov. 7, 2019, which claims benefit of US Provisional Pat. App. 62/756,799 filed on Nov. 7, 2018, the contents of which are incorporated by reference herein.

TECHNICAL FIELD

The present invention relates generally to the field of RFID labels, and more particularly, to RFID bead labels capable of withstanding and maintaining operability, especially in the ultra-high frequency range, during and post-vulcanization (e.g., pre and post-cure) of rubber articles such that the rubber articles may be continuously identified via the RFID bead label placed thereon during and post-fabrication of the rubber article.

BACKGROUND

Various synthetic and natural rubber based articles (e.g., tires, hoses, rubber mats, airsprings) are typically equipped with various identification devices, such as barcode labels or RFID labels, to monitor the manufacturing processes, inventory control, and distribution of these articles. However, labelling these articles, especially synthetic/natural rubber-based tires, rubber-based floor mats and many other rubber products like hoses, airsprings can be problematic, particularly if labelling occurs early in the tire manufacturing process—prior to vulcanization and/or quality tests of the tire.

When producing rubber-based articles like tires, an intermediate product of the tire (e.g., the "green"/un-cured and/or un-vulcanized intermediate product) is subjected to one or more vulcanization process(es) in which a plurality of tire components are fused or molded together. These processes are basically the same for synthetic rubber as for natural rubber. These processes are very physically and chemically harsh—often involving high temperature (e.g. temperatures of at least 80° C., 130° C., 140° C., up to 220° C.), high pressure, and/or cross-linking conditions. During vulcanization, the rubber-based composition is modified by forming an extensive network of crosslinks within the rubber matrix, thereby significantly increasing the strength and durability of the article. Although numerous vulcanization techniques are known in the art, most, if not all, include application of high pressure and elevated temperatures to the "green" or un-vulcanized, rubber-based article, which highly affect and render inoperable conventional identification labels (e.g., RFID and barcode-only bead labels) placed thereon.

In view of these processes, adhesive labels (barcode-only bead labels) such as those shown in FIGS. 1A, 1B, 2A, and 2B have been developed which can be applied to "green" natural and synthetic rubber-based articles such as tires, hoses, mats and airsprings which can endure relatively high temperatures and pressures associated with the vulcanization process. For example, the labels shown in FIGS. 1A, 1B, 2A, and 2B utilize a barcode-only bead label, which as further shown in FIG. 3 may be affixed to the article (e.g., a tire) during the tire manufacturing process.

Although in certain applications the barcode-only bead labels as shown in FIGS. 1A, 1B, 2A, and 2B are satisfactory, barcode-only bead labels exhibit numerous shortcomings during the tire manufacturing process, which include the following:

- the rubber products (e.g., tires) must always be oriented in a specific direction and/or moved to specific angle(s) for a "line-of-sight" scanning by bar-code readers during the manufacturing process;
- the rubber products (e.g., tires) must be moved in the field of scanning one at a time;
- additional equipment and process steps must be added to the manufacturing process and overall throughput is impacted, especially for larger products such as AGRO- and mining tires; and
- tire manufacturer is not able to 'write' other information to the label during production or share production-related information station to station;
- for some specific products like mining tires, the industry is using a curing process wherein, within the curing process, the molds need to have a plurality of ventilation holes to release air during vulcanization, and during vulcanization, rubber floats over the barcode label and therefore the barcode is not readable anymore.

In addition to the above-mentioned barcode-only bead labels, certain RFID labels are used in a limited capacity during tire production. However, current RFID labels are not able to survive the environmental stresses (high temperature, high pressure, crosslinking, moving of the product (e.g, when releasing the product out of the mold), etc.) associated with the tire vulcanization process. More particularly, after curing the tire (or rubber article) during vulcanization, the RFID inlay is rendered inoperable (e.g., unreadable and/or read performance is highly degraded beyond the minimum acceptable range for the use application). As a result, current solutions involving RFID labels have been limited to applications post-curing of the rubber article, which disadvantageously results in loss of time, increased expense associated with adding another label to the rubber article, and increased error associated with matching a newly applied RFID label post-cure to previous unique identifier associated with the same article pre-cure.

In certain instances, the label cannot be directly vulcanized to/in the synthetic or natural rubber article. For example, in certain instances, the rubber article may be formed/produced through injection molding. In the case of injection molding, the label will float away during the injection molding. Thus, there may be instances in which there is a need to apply the RFID label on to the RFID rubber-based article post-production (aftermarket).

SUMMARY

In view of the above, a need exists to provide an RFID (bead) label device that is heat resistant—capable of withstanding harsh vulcanization conditions thereby overcoming the shortcomings of conventional RFID labels. In certain aspects, the RFID (bead) label devices disclosed herein further have no line of sight requirement, thus allowing multiple tires to be identified simultaneously within field of reading and continuously throughout manufacture of the rubber article, do not require additional process steps to identify the rubber article, and in certain aspects, information can be "written" to the label during production or shared station to station.

In certain aspects, disclosed is an RFID bead label device configured to withstand and maintain RFID operability during vulcanization of a rubber article. The RFID bead label device includes (a) a protective topcoat layer that is an outermost layer of the device; (b) a rubber adhesion layer that is an innermost layer of the device and is configured to adhere the device to an unvulcanized and/or vulcanized rubber article; (c) a polyimide layer with heat resistant RFID capabilities, the polyimide layer is positioned between the protective topcoat layer and the rubber adhesion layer such that the polyimide layer with heat resistant RFID capabilities maintains RFID operability during vulcanization and post-vulcanization of the rubber article; (d) a plurality of polyester layers positioned between the topcoat layer and rubber adhesion layer with at least a first polyester layer positioned above and at least a second polyester layer positioned below the polyimide layer such that the first and second polyester layers surround the polyimide layer to insulate, protect, and maintain RFID operability of the polyimide layer with heat resistant RFID capabilities pre-vulcanization, during vulcanization, and post-vulcanization of the rubber article; and (e) a plurality of adhesive layers positioned between and bonding together the topcoat, the plurality of polyester, polyimide, and rubber adhesion layers. Furthermore, the RFID bead label device is pliable and flexible such that it may be easily applied to any desired surface of the rubber article (e.g., an inner tire surface and/or tire wall) at any point during manufacture of the rubber article.

In certain aspects, the device maintains RFID operability between 300 MHz to 3 GHz pre-vulcanization, during vulcanization, and post-vulcanization of the rubber article such that the device may maintain communication with an RFID reader pre-vulcanization, -during vulcanization, and -post-vulcanization of the rubber article.

In certain aspects, the device maintains RFID operability while subjected to temperatures of up to 220° C. for up to 12 hours.

In certain aspects, the polyimide layer with heat resistant RFID capabilities including a metallic antenna (and/or an RFID component/device (e.g., an integrated circuit or microchip) inductively or directly coupled to an antenna) positioned thereon or therein that wirelessly transmits and/or receives radiofrequency signals ranging from 300 MHz to 3 GHz from the label to the RFID reader. In certain aspects, these RFID capabilities are preferably limited to passive RFID transmission.

In certain aspects, the metallic antenna is an aluminum etched antenna connected to and integrated circuit or microchip configured for at least electronic communication, data memory, and control logic. In certain other aspects, the metallic antenna is a copper wire, steel wire, and/or a stainless steel In certain aspects, the RFID bead label device further includes a removable liner applied over and adhered to the rubber adhesion layer.

Compared to prior art, the RFID bead label devices disclosed herein demonstrate a superior identification solution that survives the stresses (such as high heat and pressure) placed on the label during the vulcanization process and retains its RFID performance allowing the technology to be utilized through the remainder of the manufacturing process. The dimensional stability of the polyimide film further assists in maintaining the structural integrity of the chip and antenna within the inlay to avoid degradation in RFID performance in addition to its ability to survive curing temperatures of 150° C.+ and/or 200° C.+.

In addition to the polyimide film-based inlay, the present subject matter is distinguished from prior art by the layers and order of materials that make up the entire construction of the pre-cure RFID-enabled label. The present subject matter contains layers of high temperature adhesives and a plurality of polyester layers included above and below the polyimide to ensure the inlay remains tightly bonded to the other materials during the vulcanization process. The plurality of polyester layers—besides providing a printable surface—also act to protect, insulate, and cushion the inlay from the high levels of pressure applied to the present subject matter while in the tire mold during vulcanization thereby maintaining RFID operability of the disclosed device.

In certain aspects, one or more outermost layer(s) of the label may be a layer of unvulcanized rubber, which is subsequently vulcanized. In this aspect and after vulcanization, the other layers of the label are inseparably affixed to either one outermost layer of vulcanized rubber and/or the other layers of the label are sandwiched between (and permanently affixed within) two spaced apart, outermost layers of the label positioned on opposite sides of the label relative to one another. In either of the instances mentioned immediately above, the labels having one or more either unvulcanized or vulcanized rubber layers that are the outermost layer of the label can be subsequently glued and/or adhered on an existing rubber product. In certain occasions the label, having the rubber backing, is only partially vulcanized. This partially vulcanized rubber can be applied on an existing rubber product (e.g., a vulcanized rubber product) by heating the product locally where the label is adhered thereto (e.g., by a so-called hot stamping process). Within this process, two hot plates of e.g. steel will locally heatup the existing product and the RFID label rubber backing. In this process, vulcanisation takes place locally (at location where the label is applied).

As alluded to above and in certain aspects, there may be a need to integrate the described label between two layers of rubber that form the outermost layers of the label (i.e., a top and bottom layer respectively) using the same process as described above. In this aspect, the label may further include an adhesive coating on one or both of the outermost rubber layers. If both of the outermost layers are unvulcanized rubber, the label will be vulcanized (or h vulcanized) between two outermost rubber layers during the heating process/vulcanization as disclosed above. In this aspect, the label construct is fully integrated between two rubber layers (e.g., vulcanized rubber layers). In certain aspects, there is a need for providing the RFID label disclosed immediately above for aftermarket uses and/or after curing the rubber article (e.g., a tire). Embodiments of the invention can include one or more or any combination of the above features and configurations.

Additional features, aspects and advantages of the invention will be set forth in the detailed description which follows, and in part will be readily apparent to those skilled in the art from that description or recognized by practicing the invention as described herein. It is to be understood that both the foregoing general description and the following detailed description present various embodiments of the invention, and are intended to provide an overview or framework for understanding the nature and character of the invention as it is claimed. The accompanying drawings are included to provide a further understanding of the invention, and are incorporated in and constitute a part of this specification.

BRIEF DESCRIPTION OF THE DRAWINGS

These and other features, aspects and advantages of the present invention are better understood when the following detailed description of the invention is read with reference to the accompanying drawings, in which:

FIG. 8A schematically depicts the RFID bead label of FIG. 6 adhered/affixed to an outermost rubber layer (e.g., either a vulcanized, partially vulcanized, or unvulcanized rubber)

DETAILED DESCRIPTION

The present invention will now be described more fully hereinafter with reference to the accompanying drawings in which exemplary embodiments of the invention are shown. However, the invention may be embodied in many different forms and should not be construed as limited to the representative embodiments set forth herein. The exemplary embodiments are provided so that this disclosure will be both thorough and complete, and will fully convey the scope of the invention and enable one of ordinary skill in the art to make, use and practice the invention. Like reference numbers refer to like elements throughout the various drawings.

Figure 5B:
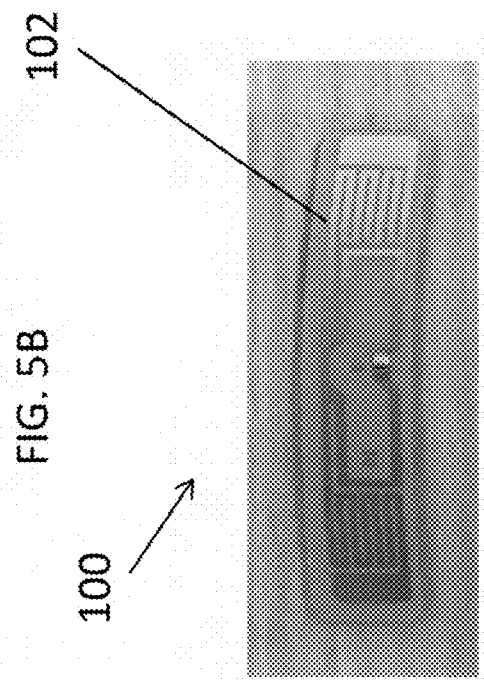
FIGS. 5A and 5B depict top and bottom views of the RFID bead label device configured to withstand and maintain operability pre-vulcanization, during vulcanization, and post-vulcanization of a rubber article.
Figure 5D:
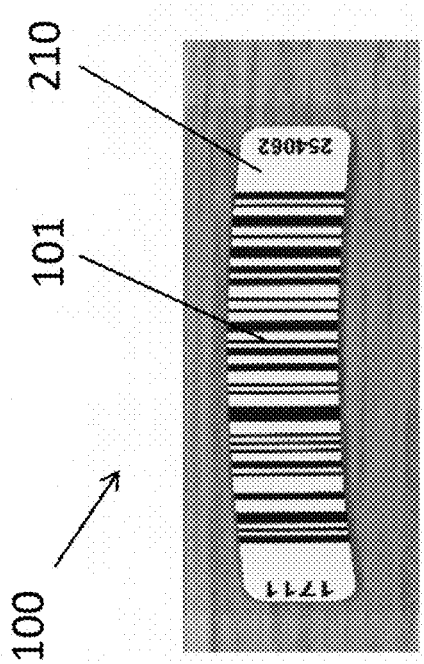
FIGS. 5C and 5D depict another RFID bead label device configured to withstand and maintain operability pre-vulcanization, during vulcanization, and post-vulcanization of a rubber article having different polyester layer with image printed thereon when compared to FIGS. 5A and 5B.
Figure 5A:
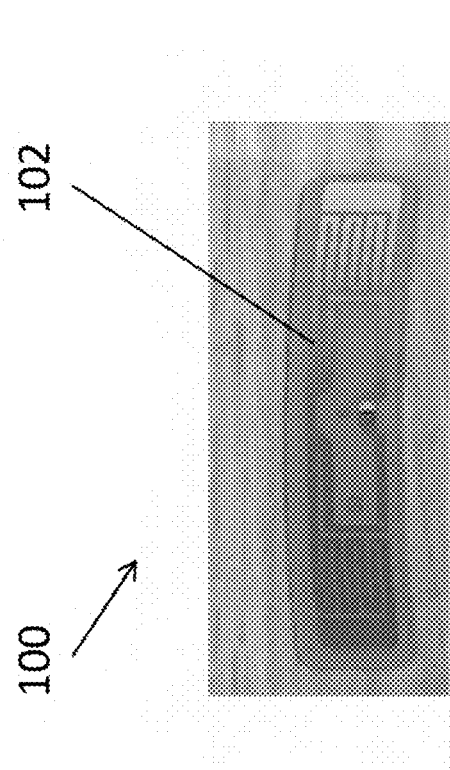
Figure 5C:
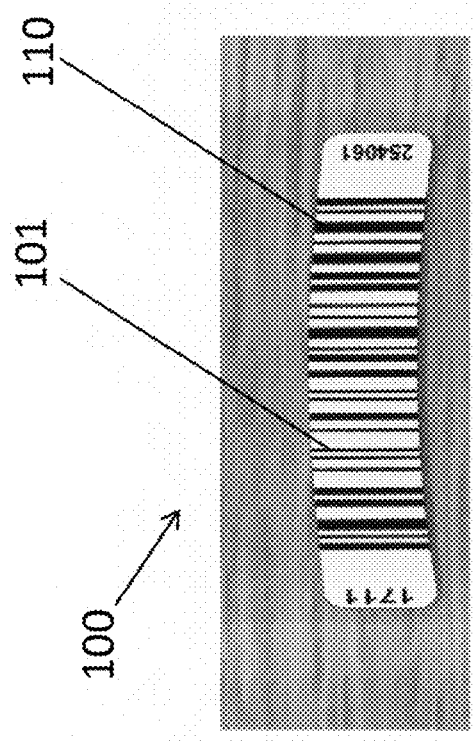
Figure 6:
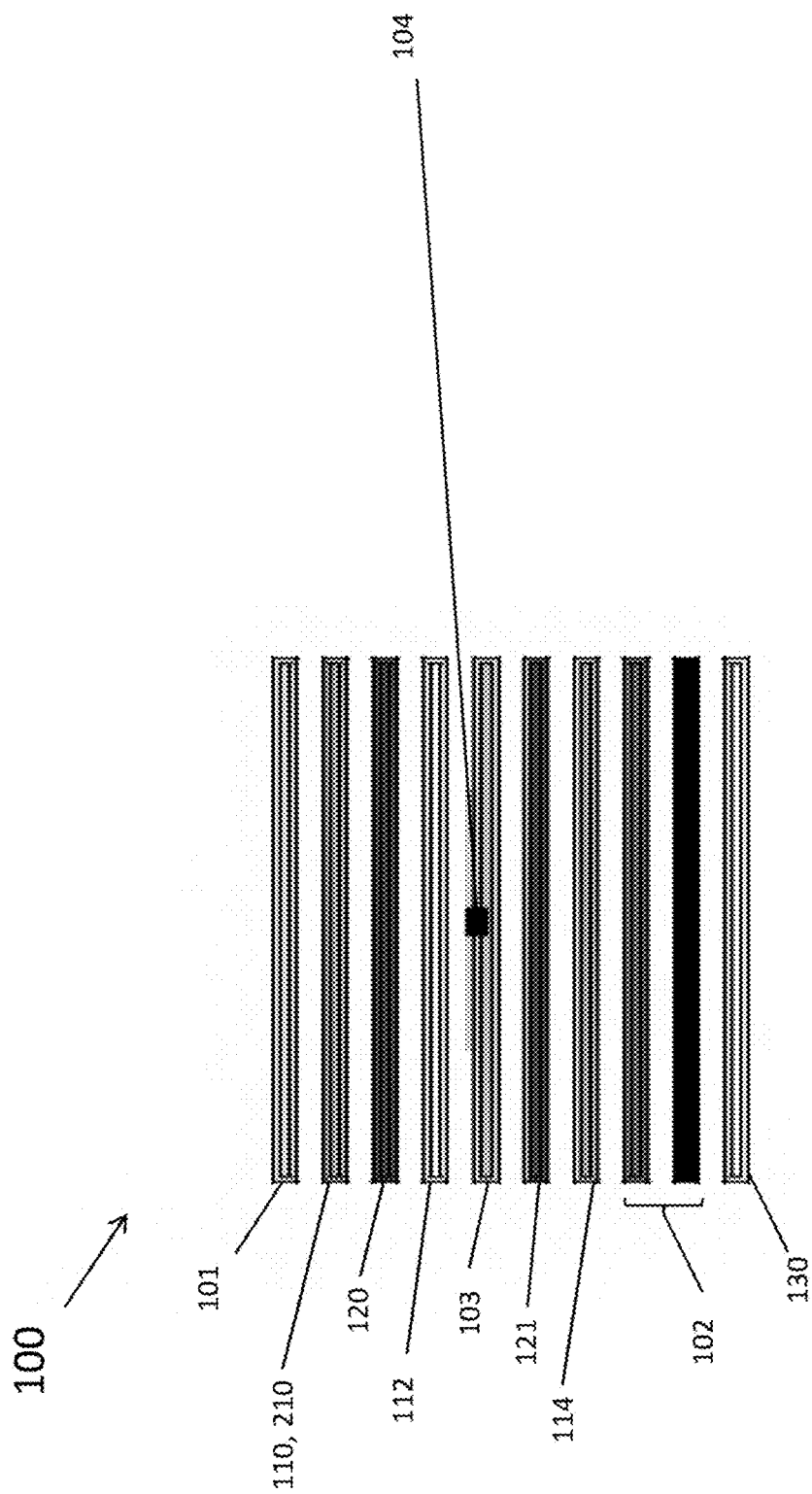
FIG. 6 schematically depicts the plurality of layers comprising the RFID bead label device configured to withstand and maintain operability pre-vulcanization, during vulcanization, and post-vulcanization of a rubber article.

FIGS. 4A-6 depict the RFID bead label device 100 and individual components of the device as disclosed further herein, and FIG. 6 more specifically schematically depicts the RFID bead label device 100 disclosed herein as well as the plurality of layers comprising the device. In view of FIG. 6, disclosed is an RFID bead label device 100 configured to withstand and maintain RFID operability at desired frequencies pre-vulcanization, during vulcanization, and post-vulcanization of the rubber article (not shown) such that the RFID bead label device can communicate with and be read by an RFID reader (or other desired electronic device(s)) (preferably with passive RFID) pre-vulcanization, during vulcanization, and post-vulcanization while the device is adhered/affixed to the rubber article.

As further shown in FIG. 6, the RFID bead label device 100 includes (a) a protective topcoat layer 101 that is an outermost layer of the device (e.g., a silane layer 0.05-2.0 wt % (coat weight g/m$^2$) preferably Z-6032 Silane by Dow) that improves adhesion of organic resins to inorganic surfaces; (b) a rubber adhesion layer 102 that is an innermost layer of the device (ranging from 0.045 to 0.06 mm in thickness, preferably having 0.0508 mm in thickness) and is configured to adhere the device to an unvulcanized and/or vulcanized rubber article (e.g., a "green" or unvulcanized tire or a vulcanized tire); (c) a polyimide layer 103 (ranging from 0.025 to 0.06 mm in thickness, preferably having 0.0508 mm in thickness) with heat resistant RFID capabilities 104 (e.g., antenna and integrated chip (IC)), the polyimide layer 103 being positioned between the protective topcoat layer 101 and the rubber adhesion layer 102 such that the polyimide layer 103 with heat resistant RFID capabilities 104 maintains RFID operability pre-vulcanization, during vulcanization, and post-vulcanization of the rubber article; (d) a plurality of polyester layers 110 (or 210), 112, 114 (with the top and/or bottom polyester layer(s) ranging from 0.07 to 0.08 mm in thickness, preferably having a 0.0762 mm thickness and the middle polyester layers ranging from 0.03 to 0.04 mm in thickness, preferably having a 0.0381 mm thickness) positioned between the topcoat layer 101 and rubber adhesion layer 102 with at least a first polyester layer 110, 210, and/or 112 positioned above and at least a second polyester layer 114 positioned below the polyimide layer 103 such that the first and second polyester layers surround the polyimide layer to insulate, protect, and maintain RFID operability of the polyimide layer 103 with heat resistant RFID capabilities 104 during vulcanization of the rubber article; and (e) a plurality of adhesive layers 120, 121 (ranging from 0.025 to 0.06 mm in thickness, preferably having 0.0508 mm in thickness) positioned between and bonding together the topcoat, the plurality of polyester, polyimide, and rubber adhesion layers thereby forming device 100. In certain aspects, the RFID bead label device 100 further includes a removable liner 130 applied over and adhered to the rubber adhesion layer that is subsequently removed when the device 100 is applied to the desired article. Furthermore, the RFID bead label device is sufficiently pliable and flexible such that it may be easily applied to any desired surface of the rubber article (e.g., an inner tire surface and/or tire wall). In certain aspects, the device 100 maintains RFID operability while subjected to temperatures of up to 220° C. for up to 12 hours.

It should be noted that the polyimide layer 103 (polyimide film) advantageously possesses a unique combination of properties that allows the film to maintain its excellent physical, electrical, and mechanical properties over a wide temperature range, which advantageously facilitates the ability of the device to maintain its RFID capabilities during vulcanization. The polyimide layer 103 (polyimide film) is synthesized by polymerizing an aromatic dianhydride and an aromatic diamine and has excellent chemical resistance, with the film having no known degradative solvents. Moreover, the polyimide layer 103 (polyimide film) is an excellent dielectric substrate that meets the stringent requirements of flexible circuitry and in certain aspects, is resiliently and/or elastically deformable. The polyimide layer 103 is also an excellent insulator due its low outgassing rate, which further aids in insulating and protecting the RFID capabilities 104 of the disclose device during vulcanization processes. In certain aspects, the polyimide layer 103 (polyimide film) disclose herein has a thickness ranging from 0.0254 mm to 0.0508 mm.

Figure 1B:
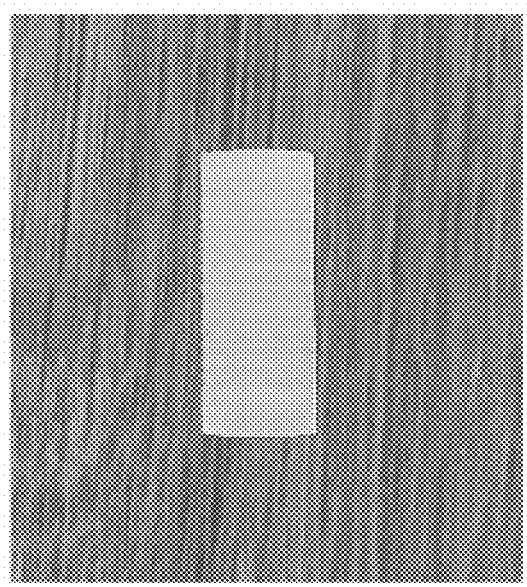
FIGS. 1A and 1B depict top and bottom views respectively of an exemplary, conventional barcode-only bead label configured for attachment to and identification of rubber based articles during manufacture thereof.
Figure 1A:
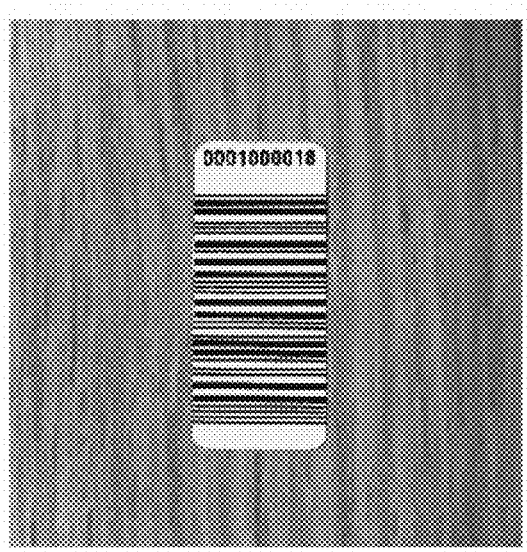
Figure 2B:
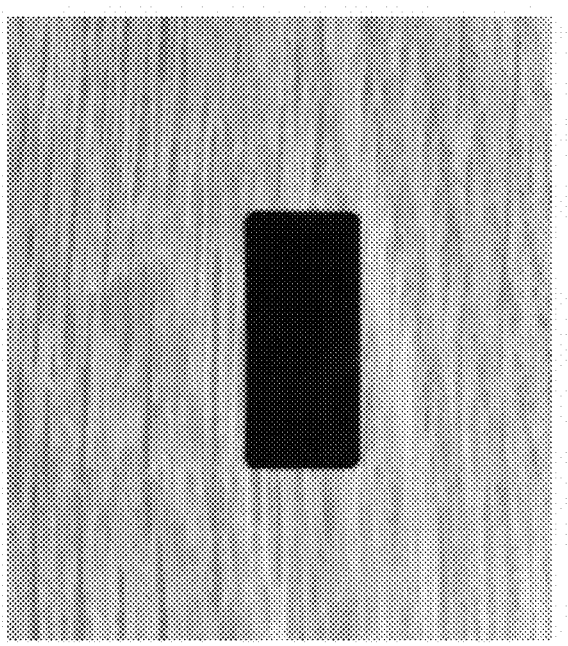
FIGS. 2A and 2B depict top and bottom views respectively of another exemplary, conventional barcode-only bead label configured for attachment to and identification of rubber based articles during manufacture thereof.
Figure 2A:
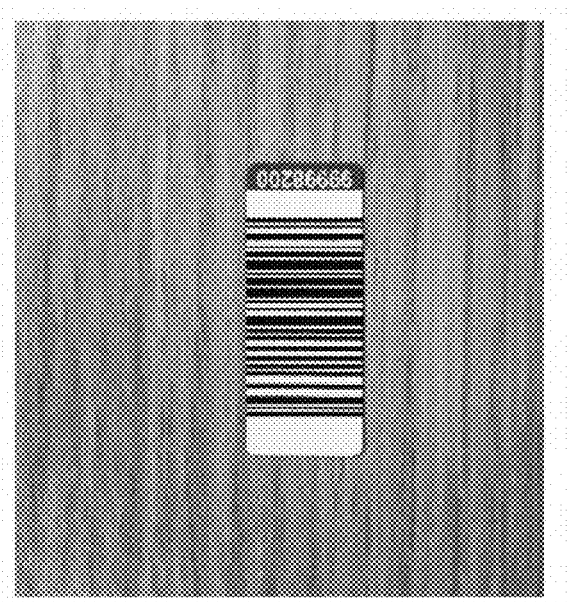
Figure 3:
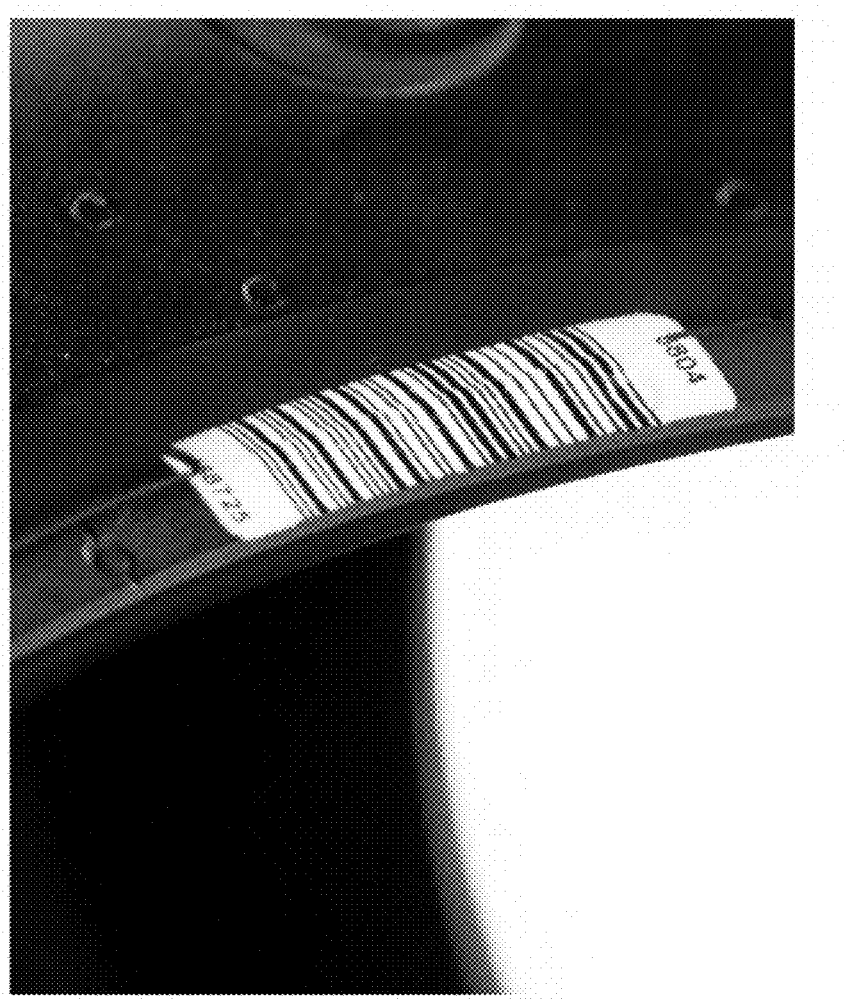
FIG. 3 is depicts an exemplary barcode-only bead label affixed to a tire.
Figure 4A:
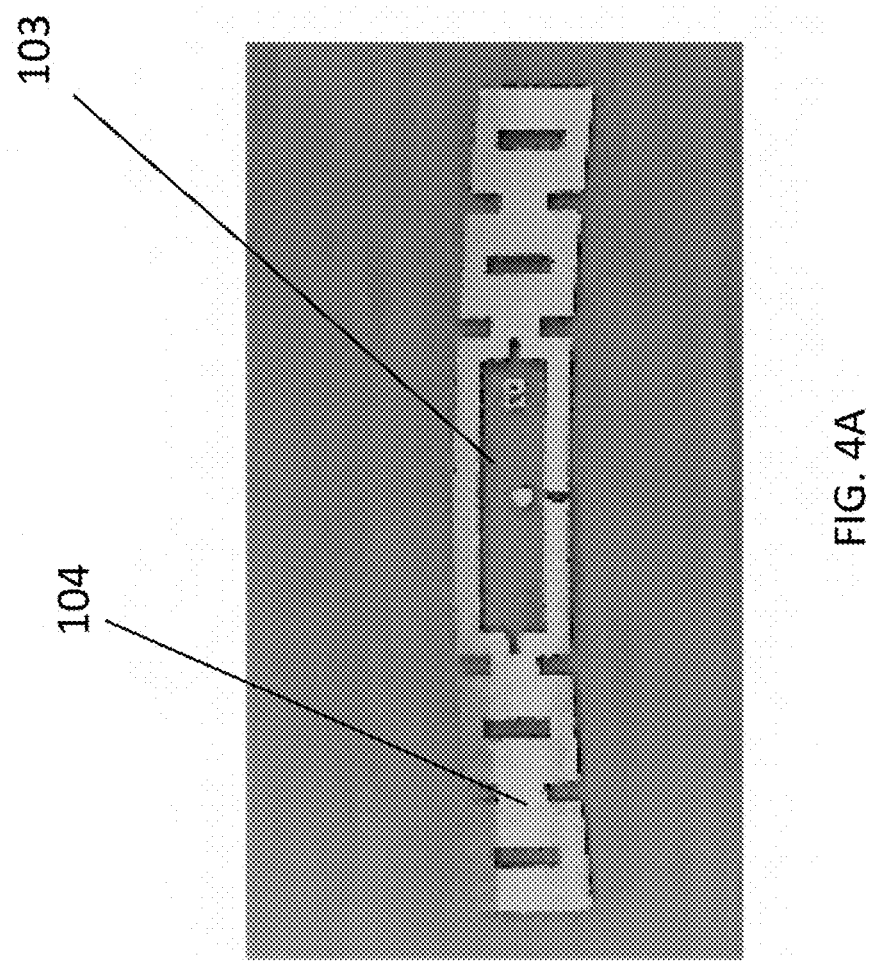
FIGS. 4A and 4B depict an aluminum-etched antenna on the polyimide film that is to be included in the RFID bead label device configured to withstand and maintain RFID operability during vulcanization of a rubber article.
Figure 4B:
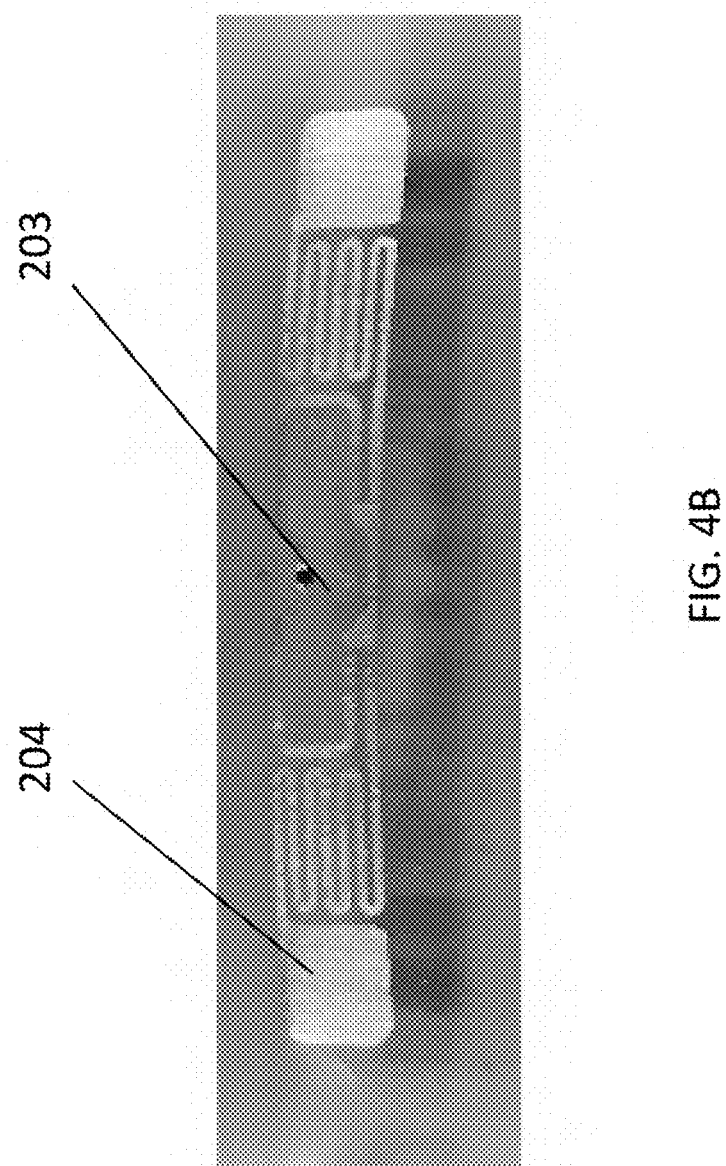

FIGS. 4A and 4B further depict two different polyimide layers 103, 203 with RFID capabilities 104, 204 (i.e., different antenna configurations). More specifically, the polyimide layer 103 includes an antenna (e.g., metallic antenna) and in certain aspects is operatively connected to an integrated circuit (IC) or microchip that further enable the RFID capabilities of the device such that the device may communicate with an RFID reader (or other desired electronic device) pre-vulcanization, during vulcanization, and post-vulcanization of the rubber article. FIGS. 4A and 4B specifically depict different aluminum etched antennae along with IC or microchips configured for electronic communication, data memory, and control logic while within the polyimide layer of the device. The polyimide layer 103 with heat resistant RFID capabilities 104, 204 shown in FIGS. 4A and 4B preferably wirelessly transmits and/or receives radiofrequency signals ranging from 300 MHz to 3 GHz (i.e., at ultra-high frequencies (UHF)) to another electronic device (e.g., an RFID reader or other desired electronic device) and maintains operability within the device 100 when attached to the rubber article pre-vulcanization, during vulcanization, and post-vulcanization of the rubber article. In certain aspects, the RFID capabilities of device 100 are configured to operate in passive UHF (i.e., 300 MHz to 3 GHz).

It should be noted that RFID devices generally include an antenna for wirelessly transmitting and/or receiving RF signals and analog and/or digital electronics operatively connected thereto. So called semi-passive RFID devices may also include a battery or other suitable power source. Commonly, the electronics are implemented via an integrated circuit (IC) or microchip or other suitable electronic circuit and may include, e.g., communications electronics, data memory, control logic, etc. In certain aspects, the device 100 disclosed herein may be further configured for active or semi-passive RFID if so desired.

In general, RFID devices often operate in one of a variety of frequency ranges including, e.g., a low frequency (LF) range (i.e., from approximately 30 kHz to approximately 300 kHz), a high frequency (IF) range (i.e., from approximately 3 MHz to approximately 30 MHz) and an ultra-high frequency (UHF) range (i.e., from approximately 300 MHz to approximately 3 GHz). A passive device commonly operates in any one of the aforementioned frequency ranges.

In particular, for passive devices: LF systems commonly operate at around 124 kHz, 125 kHz or 135 kHz; HF systems commonly operate at around 13.56 MHz; and, UHF systems commonly use a band anywhere from 860 MHz to 960 MHz. Alternately, some passive device systems also use 2.45 GHz and other areas of the radio spectrum. Active RFID devices typically operate at around 455 MHz, 2.45 GHz, or 5.8 GHz. Often, semi-passive devices use a frequency around 2.4 GHz.

The read range of an RFID device (i.e., the range at which the RFID reader can communicate with the RFID device) is generally determined by many factors, e.g., the type of device—passive, active, etc.). Typically, passive LF RFID devices (also referred to as LFID or LowFID devices) can usually be read from within approximately 12 inches (0.33 meters); passive HF RFID devices (also referred to as HFID or HighFID devices) can usually be read from up to approximately 3 feet (1 meter); and passive UHF RFID devices (also referred to as UHFID devices) can be typically read from approximately 10 feet (3.05 meters) or more. In preferred aspects, the RFID bead label devices 100 disclosed herein are preferably configured as passive UHF RFID devices operable in the ranges of 860 MHz to 960 GHz and capable of being read by an RFID reader from a distance of at least 8 feet away, 10 feet away, 15 feet away, and/or up to 25 feet away. One important factor influencing the read range for passive RFID devices is the method used to transmit data from the device to the reader, i.e., the coupling mode between the device and the reader—which can typically be inductive coupling, direct coupling, or radiative/propagation coupling. Passive LFID devices and passive HFID devices commonly use inductive coupling between the device and the reader, whereas passive UHFID devices commonly use radiative or propagation coupling between the device and the reader.

Alternately, in radiative or propagation coupling applications (e.g., as are conventionally used by passive UHFID devices), rather than forming an electromagnetic field between the respective antennas of the reader and device, the reader emits electromagnetic energy which illuminates the device. In turn, the device gathers the energy from the reader via its antenna, and the device's IC or microchip uses the gathered energy to change the load on the device antenna and reflect back an altered signal, i.e., backscatter. Commonly, UHFID devices can communicate data in a variety of different ways, e.g., they can increase the amplitude of the reflected wave sent back to the reader (i.e., amplitude shift keying), shift the reflected wave so it is out of phase received wave (i.e., phase shift keying) or change the frequency of the reflected wave (i.e., frequency shift keying). In any event, the reader picks up the backscattered signal and converts the altered wave into data that is understood by the reader or adjunct computer.

The antenna employed in an RFID device is also commonly affected by numerous factor, e.g., the intended application, the type of device (i.e. passive, semi-active, etc.), the desired read range, the device-to-reader coupling mode, the frequency of operation of the device, etc. For example, insomuch as passive LFID devices are normally inductively coupled with the reader, and because the voltage induced in the device antenna is proportional to the operating frequency of the device, passive LFID devices are typically provisioned with a coil antenna having many turns in order to produce enough voltage to operate the device's IC or microchip. Comparatively, a HFID passive device will often be provisioned with an antenna which is a planar spiral (e.g., with 5 to 7 turns over a credit-card-sized form factor), which can usually provide read ranges on the order of tens of centimeters. Commonly, HFID antenna coils can be less costly to produce (e.g., compared to LFID antenna coils), since they can be made using techniques relatively less expensive than wire winding, e.g., lithography or the like. UHFID passive devices, such as those disclosed herein, are usually radioactively and/or propagationally-coupled with the reader antenna and consequently can often employ dipole-like antennas. In certain aspects, the RFID Bead label devices disclosed herein operate exclusively with passive RFID.

FIGS. 5A and 5B depict top and bottom views of the RFID bead label device configured to withstand and maintain operability during vulcanization and post-vulcanization of a synthetic and natural rubber article, and FIGS. 5C and 5D depict another RFID bead label device configured to withstand and maintain operability during vulcanization and post-vulcanization of a rubber article having different polyester layer with image printed thereon when compare to FIGS. 5A and 5B. More particularly and as further shown in FIGS. 5A-5D (and in further view of FIG. 6), it should be further noted that the images printed on an outermost polyester layer 110, 210 may having varying indicia printed thereon. For example, these indicia may include lot numbering, bar codes, or another identification form in addition to those provided by the RFID capabilities 104 of the disclosed device 100.

As discussed above, the device 100 disclosed herein advantageously maintains RFID capabilities—capable of withstanding harsh vulcanization conditions thereby overcoming the shortcomings of conventional RFID labels. Moreover, the RFID bead label devices disclosed herein advantageously have no line of sight requirement, allow for multiple tires to be identified simultaneously within field of reading, do not require additional process steps to identify, and in certain aspects, information can be 'written' to the label during production or shared station to station, which greatly reduces expense related to conventional synthetic and natural rubber article manufacture as well as concurrently reducing the likelihood of error often associated with matching a newly applied RFID label post-cure to previous unique identifier associated with the article pre-cure. The device 100 disclosed herein further advantageously enables inventory control distribution of the rubber articles as prepared when leaving the manufacturing plant and subsequently entering the supply chain.

In certain aspects and as shown in FIGS. 7A-9B, the RFID bead label devices 200, 300, 400, 500 shown herein may further include one or more outermost layer(s) 201, 301 formed from rubber (one of vulcanized rubber, unvulcanized rubber, and/or partially vulcanized rubber). Numerals/features 101, 110, 210, 120, 112, 103, 121, 114, 102, and 130 shown within FIGS. 7A-9B are substantially identical to those same numerals/features mentioned above. The RFID bead label devices 200, 300, 400, 500 that are adapted to be included with rubber articles (e.g., tires) during vulcanization and/or for aftermarket uses and/or after curing the rubber article (e.g., a tire).

Figure 7A:
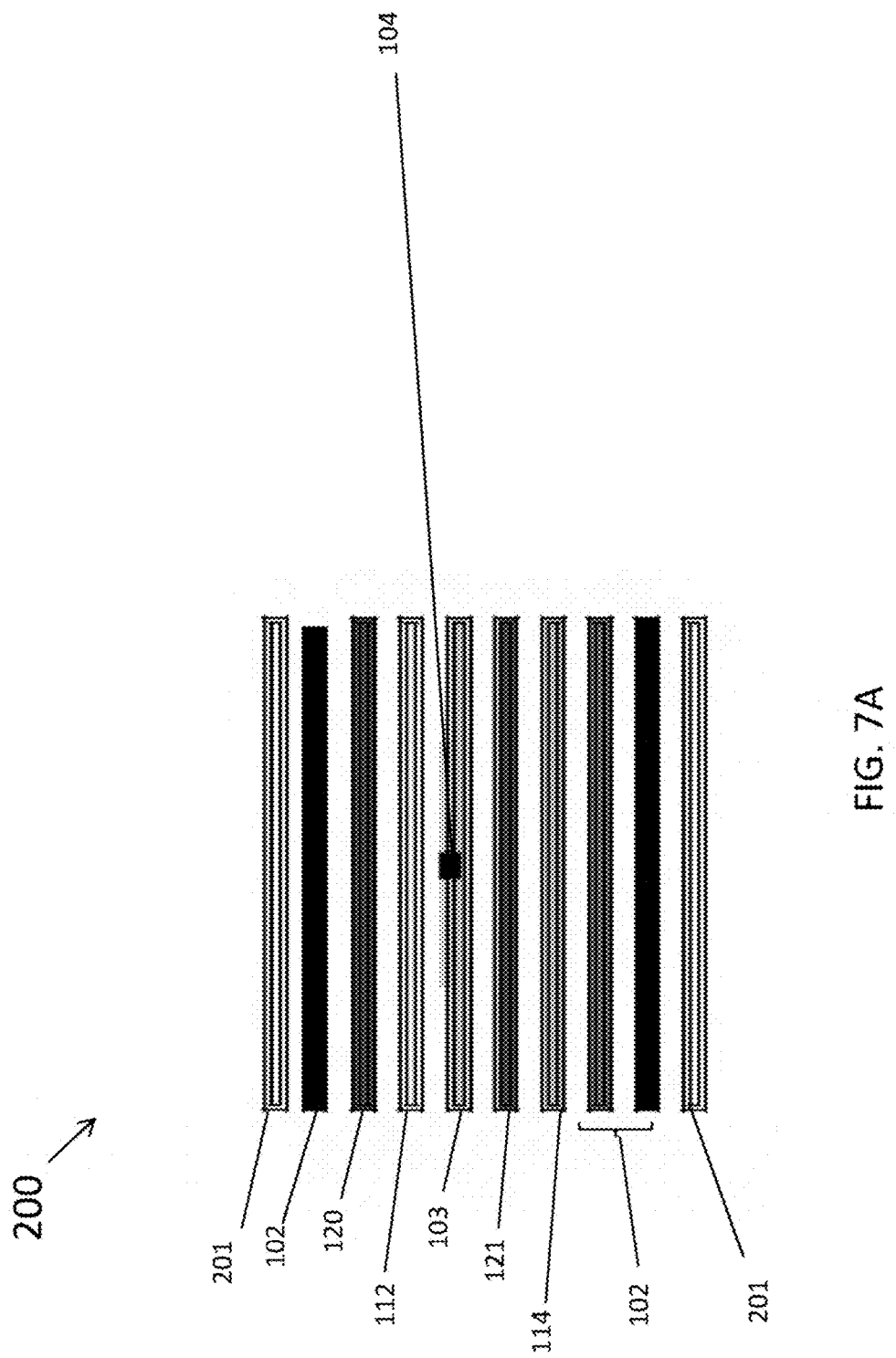
FIG. 7A schematically depicts an RFID bead label having its outermost layers formed from rubber (e.g., either a vulcanized, partially vulcanized, or unvulcanized rubber)
Figure 7B:
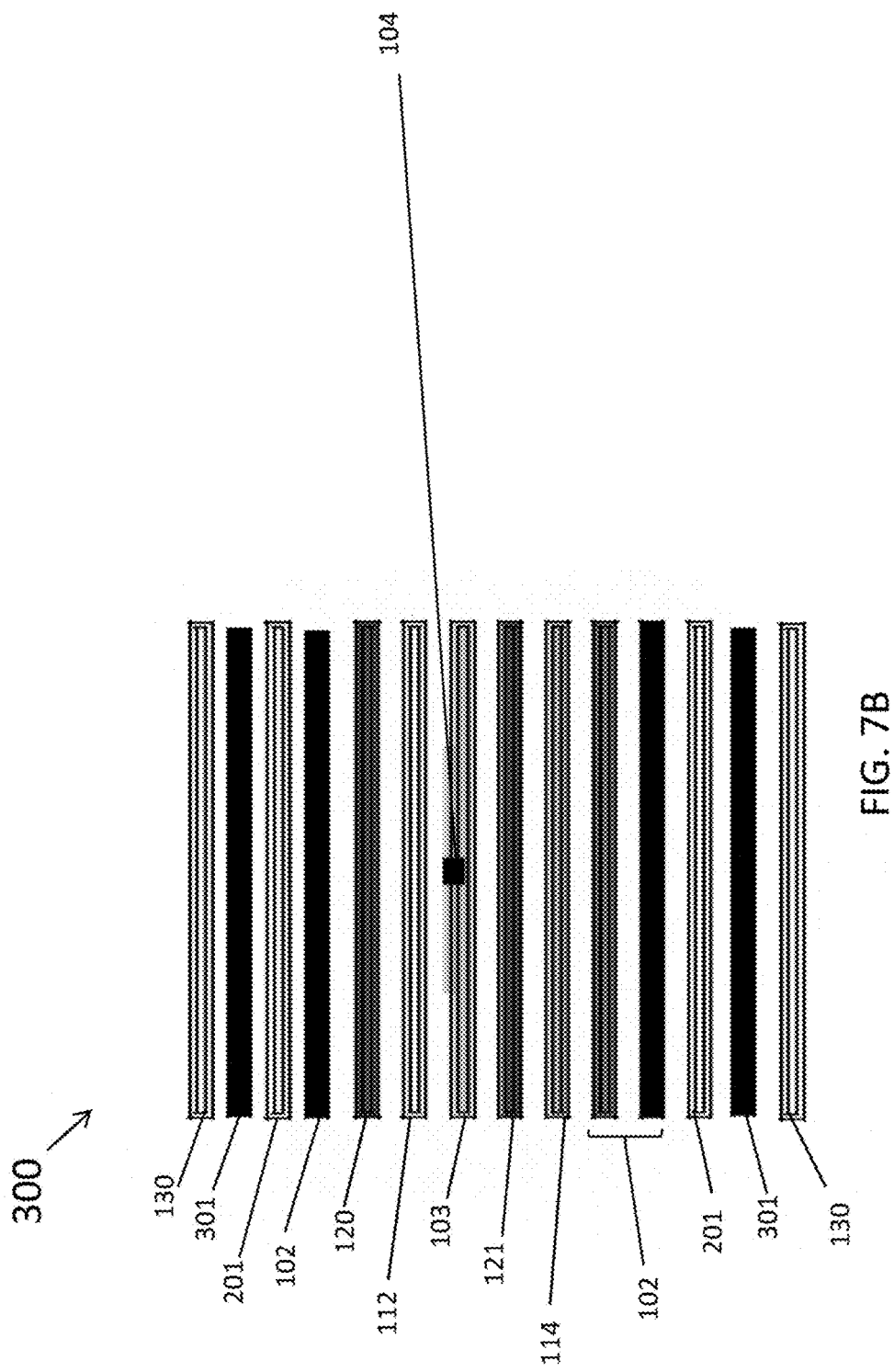
FIG. 7B schematically depicts an RFID bead label having an adhesive applied on outermost layers formed from rubber (e.g., either a vulcanized, partially vulcanized, or unvulcanized rubber)
Figure 9A:
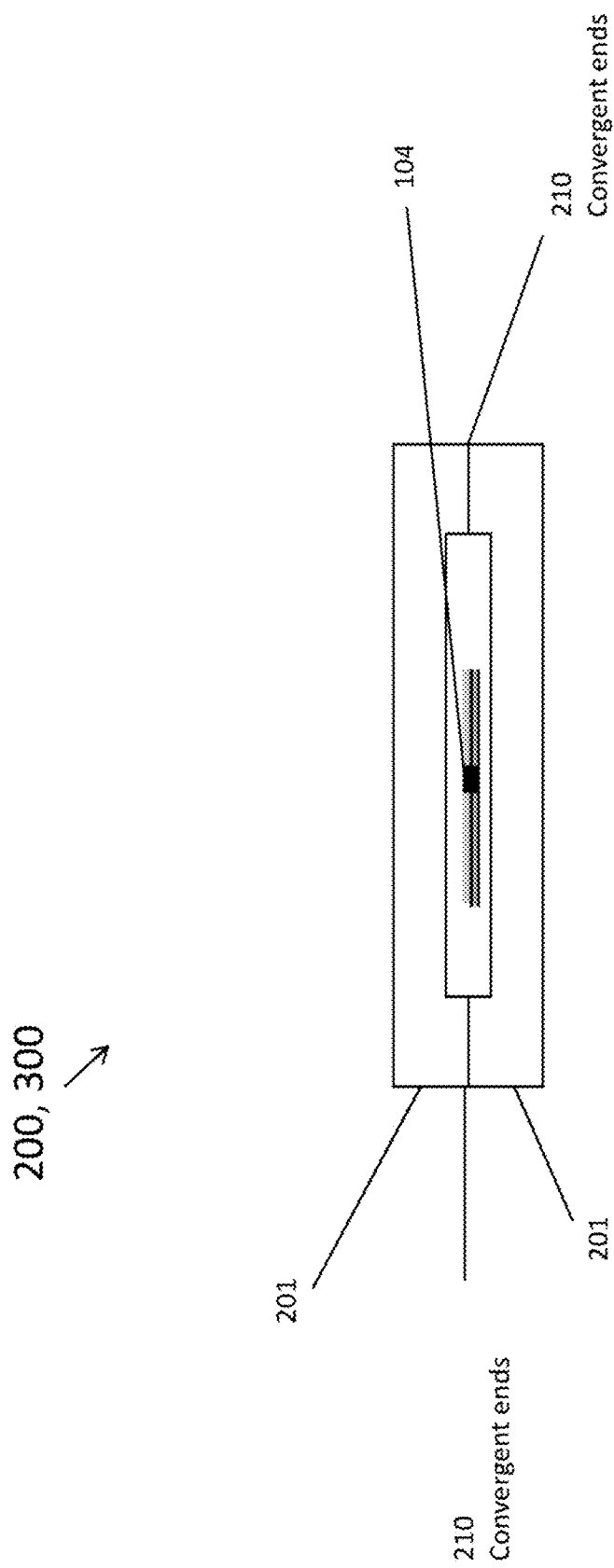
FIG. 9A depicts a general schematic of the RFID bead label shown in FIGS. 7A and 7B, with the label have two outermost layers formed of rubber with a plurality of additional layers and the RFID device (e.g., antenna with Integrate Chip) affixed thereon.

FIG. 9A depicts a general schematic of the RFID bead label 200, 300 shown in FIGS. 7A and 7B respectively, with the label having two outermost layers formed of rubber with a plurality of additional layers and the RFID device (e.g., antenna with Integrated Chip) sandwiched therein. As shown in FIG. 9A and as further envisioned in view of FIGS. 7A and 7B, the two outermost layers formed of rubber have convergent ends 210 with a plurality of additional layers and including the RFID device sandwiched therein.

As shown in FIGS. 7A and 7B, the RFID bead labels 200, 300 shown therein include substantially the same layers as those shown in FIG. 6, but in some aspects, these devices may omit at least the topcoat layer 101 of FIG. 6. In certain aspects and as further shown in FIG. 7B, RFID bead label 300 differs from RFID bead label 200 shown in FIG. 7A by including an adhesive layer/coating 301 coated on at least one of or both outermost layers 201 formed of rubber. With regard to the RFID bead label 300 shown in FIG. 7B, a removable liner 130 may be removably adhered to the label and may be removed when beginning to use the label.

In view of the labels 200, 300 shown in FIGS. 7A, 7B, and 9A and as alluded to above, it should be noted that depending on the desired use of the RFID bead labels 200, 300 depicted in FIGS. 7A, 7B, and 9A, the outermost layers formed of rubber 201 may be completely vulcanized, partially vulcanized/unvulcanized, or green, unvulcanized rubber. For example, when the labels 200, 300 of FIGS. 7A, 7B, and 9A are to be included within and/or vulcanized to a rubber article (e.g., a green tire) during vulcanization, these labels 200, 300 may include outermost layers 201 formed of unvulcanized rubber; these labels 200, 300 (having unvulcanized outermost layers) may be positioned in and/or adhered (if adhesive 301 as shown in FIG. 7B is present) to the green tire and subsequently subjected to vulcanization processes to vulcanize the label and rubber article such that the label is integrally included within the vulcanized tire. In other aspects, however, the labels 200, 300 shown in FIGS. 7A, 7B, and 9A may be adapted for aftermarket purposes (i.e., application to existing rubber products such as vulcanized tires). In this aspect and in view of the labels 200, 300 shown in FIGS. 7A, 7B, and 9A, the outermost layers 201 formed of rubber is partially vulcanized. These labels and more particularly one of the outermost layers that is partially vulcanized rubber can be applied on and subsequently affixed to an existing rubber product (e.g., a vulcanized rubber product) by heating the product locally where the label is adhered thereto (e.g., by a "hot stamping" process). Within this product two hot plates of e.g. steel will locally heatup the existing product and the RFID label rubber backing. In this process vulcanization takes place locally (at location where the label is applied). In other aspects, the labels 200, 300 shown in FIGS. 7A, 7B, and 9A may include outermost layers 201 formed of rubber (i.e., vulcanized rubber) and may further include an adhesive coating on one or more of the outermost layers 201. In this aspect, the label 200, 300 having an outermost layer 201 formed of vulcanized rubber may be temporarily and/or permanently adhered to a desired surface of a vulcanized rubber article (e.g., a vulcanized tire) by contacting the adhesive 301 of the label 300 shown in FIG. 7B with the desired surface of a vulcanized rubber article (e.g., a vulcanized tire).

Figure 8B:
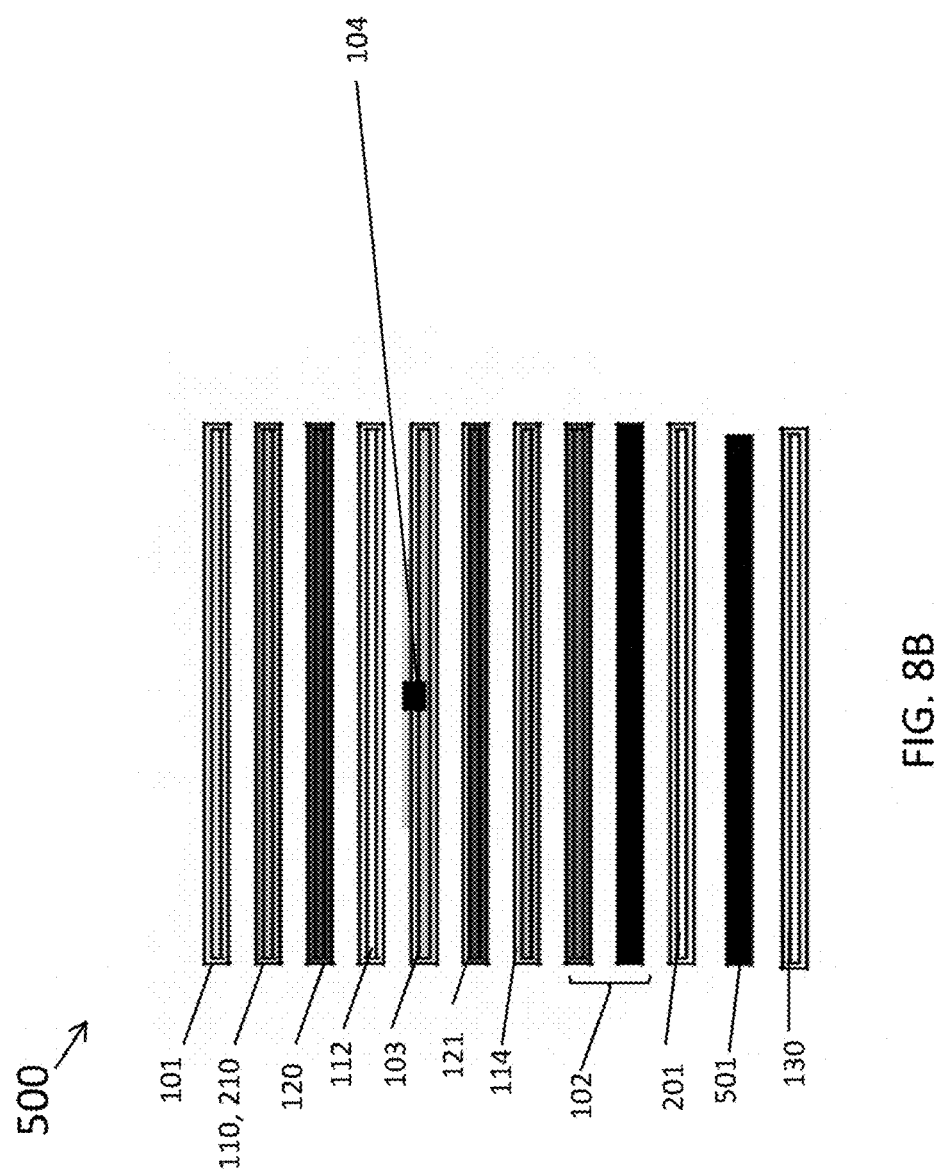
FIG. 8B schematically depicts the RFID bead label of FIG. 8A having an adhesive applied on the outermost rubber layer (e.g., either a vulcanized, partially vulcanized, or unvulcanized rubber)
Figure 9B:
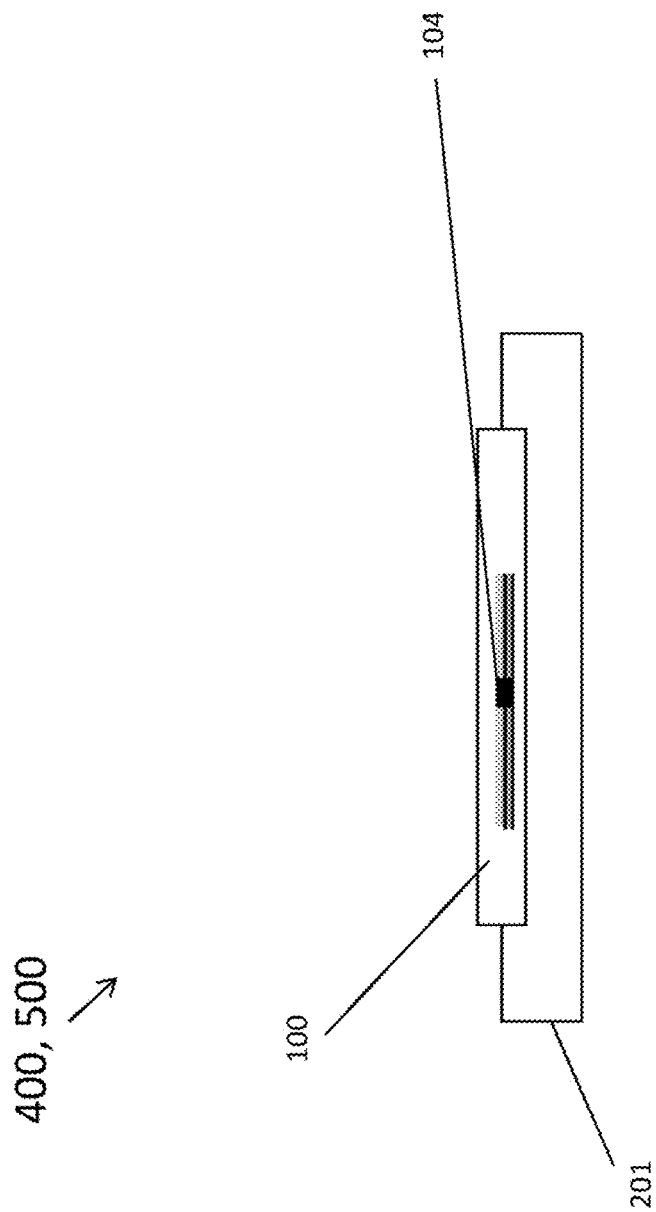
FIG. 9B depicts a general schematic of the RFID bead label shown in FIGS. 8A and 8B, with the label having a single outermost layer formed of rubber (forming a base of the label) and a plurality of additional layers including the RFID device (e.g., antenna with Integrate Chip) affixed thereon.

FIG. 9B depicts a general schematic of the RFID bead label 400, 500 shown in FIGS. 8A and 8B, with the label 400, 500 having a single outermost layer 201 formed of rubber (forming a base of the label) and a plurality of additional layers including the RFID device (e.g., antenna with Integrate Chip) affixed thereon.

The single outermost layer 201 formed of rubber in label 400, 500 (shown in FIGS. 8A and 8B) include one of a vulcanized rubber, a partially vulcanized rubber, or an unvulcanized rubber. In certain aspects and depending on the desired use/purpose of the label 400, 500, the outermost layer may further include an adhesive coated thereon as shown, for example, in FIG. 8B. When adhesive 501 is present and with regard to the RFID bead label 500 shown in FIG. 8B, a removable liner 130 may be removably adhered to the label and may be removed when beginning to use the label.

In view of the labels 400, 500 shown in FIGS. 8A, 8B, and 9B and as alluded to above, it should be noted that depending on the desired use of the RFID bead labels 400, 500 depicted in FIGS. 8A, 8B, and 9B, the outermost layer formed of rubber 201 may be completely vulcanized, partially vulcanized/unvulcanized, or green, unvulcanized rubber. For example, when the labels 400, 500 of FIGS. 8A, 8B, and 9B are to be included within and/or vulcanized to a rubber article (e.g., a green tire) during vulcanization, these labels 400, 500 may include outermost layer 201 formed of unvulcanized rubber; these labels 400, 500 (having unvulcanized outermost layer) may be positioned in and/or adhered (if adhesive 501 as shown in FIG. 8B is present) to the green tire and subsequently subjected to vulcanization processes to vulcanize the label and rubber article such that the label is integrally included within the vulcanized tire. In other aspects, however, the labels 400, 500 shown in FIGS. 8A, 8B, and 9B may be adapted for aftermarket purposes (i.e., application to existing rubber products such as vulcanized tires). In this aspect and in view of the labels 400, 500 shown in FIGS. 8A, 8B, and 9B, the outermost layer 201 formed of rubber is partially vulcanized. These labels and more particularly one of the outermost layers that is partially vulcanized rubber can be applied on and subsequently affixed to an existing rubber product (e.g., a vulcanized rubber product) by heating the product locally where the label is adhered thereto (e.g., by a "hot stamping" process). Within this product two hot plates of e.g. steel will locally heatup the existing product and the RFID label rubber backing. In this process vulcanization takes place locally (at location where the label is applied). In other aspects, the labels 400, 500 shown in FIGS. 8A, 8B, and 9B may include outermost layers 201 formed of rubber (i.e., vulcanized rubber) and may further include an adhesive coating 501 on the outermost layer 201. In this aspect, the label 400, 500 having an outermost layer 201 formed of vulcanized rubber may be temporarily and/or permanently adhered to a desired surface of a vulcanized rubber article (e.g., a vulcanized tire) by contacting the adhesive 501 of the label 500 shown in FIG. 8B with the desired surface of a vulcanized rubber article (e.g., a vulcanized tire).

The foregoing description provides embodiments of the invention by way of example only. It is envisioned that other embodiments may perform similar functions and/or achieve similar results. Any and all such equivalent embodiments and examples are within the scope of the present invention and are intended to be covered by the appended claims.

What is claimed is:

1. A RFID bead label device configured to be affixed to an unvulcanized rubber article and withstand and maintain RFID operability during vulcanization of the rubber article, the RFID bead label device comprising:
    (a) a protective topcoat layer that is an outermost layer of the device;
    (b) a rubber adhesion layer configured to attach the device to the unvulcanized and/or vulcanized rubber article;
    (c) a polyimide layer with a heat resistant RFID device positioned thereon or therein, the polyimide layer is positioned between the protective topcoat layer and the rubber adhesion layer such that the polyimide layer with heat resistant RFID capabilities maintains RFID operability during vulcanization and post-vulcanization of the rubber article; and
    (d) a plurality of polyester layers positioned between the topcoat layer and rubber adhesion layer and that surround the polyimide layer to insulate, protect, and maintain RFID operability of the polyimide layer with heat resistant RFID capabilities during vulcanization of the rubber article.

2. The RFID bead label device of claim 1, wherein the device maintains RFID operability between 300 MHz to 3 GHz pre-vulcanization, during vulcanization, and post-vulcanization of the rubber article.

3. The RFID bead label device of claim 1, wherein the device maintains RFID operability while subjected to temperatures of up to 220° C. for up to 12 hours.

4. The RFID bead label device of claim 1, wherein the polyimide layer with heat resistant RFID capabilities comprises a metallic antenna positioned thereon or therein configured for passive RFID transmission both transmitting and/or receiving radiofrequency signals ranging from 300 MHz to 3 GHz.

5. The RFID bead label device of claim 4, wherein the metallic antenna is an aluminum etched antenna and integrated circuit or microchip configured for at least electronic communication, data memory, and control logic.

6. The RFID bead label device of claim 1, further comprising a removable liner applied over and adhered to the rubber adhesion layer.

7. The RFID bead label device of claim 1, further comprising a plurality of adhesive layers positioned between and bonding together the topcoat, the plurality of polyester, polyimide, and rubber adhesion layers.

* * * * *